Figure 1:
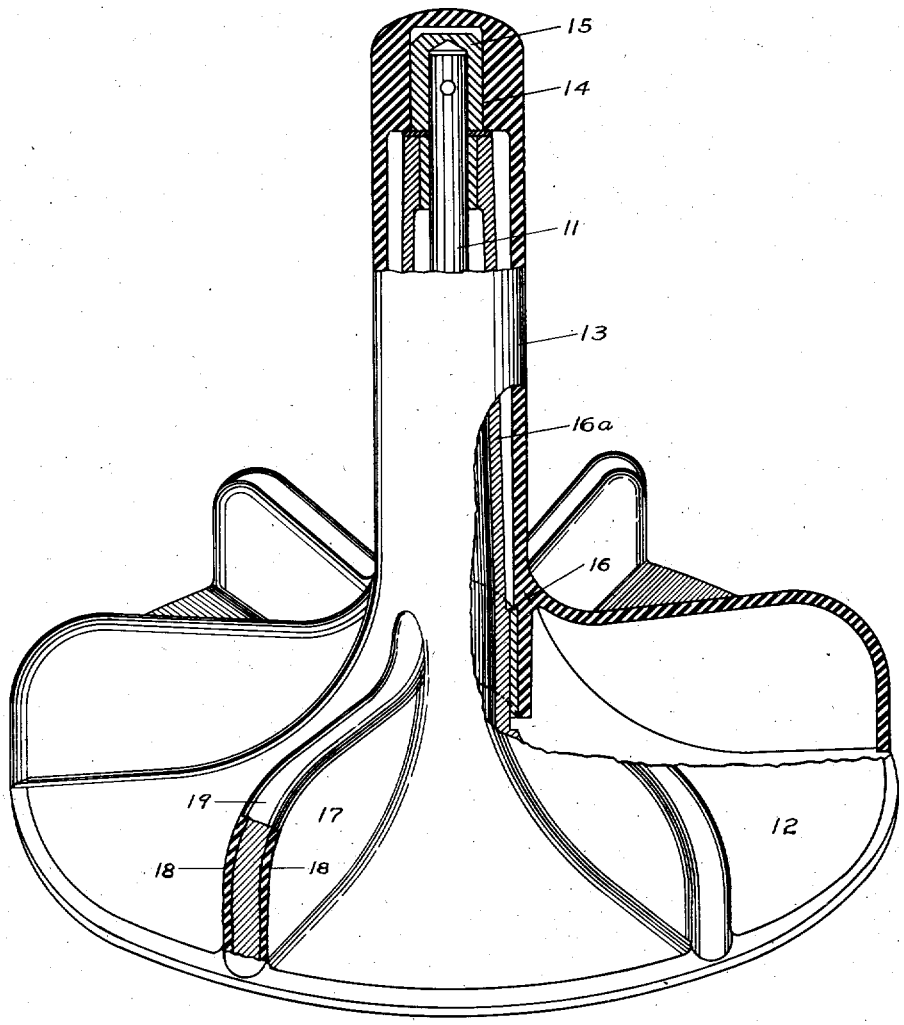

Sept. 20, 1927.

J. ROCKE

AGITATOR FOR WASHING MACHINES

Original Filed May 26, 1926

Re. 16,743

INVENTOR
John Rocke
BY
Jeffs and Jeffs
ATTORNEYS

Reissued Sept. 20, 1927. Re. 16,743

UNITED STATES PATENT OFFICE.

JOHN BOCKE, OF BLOOMINGTON, ILLINOIS.

AGITATOR FOR WASHING MACHINES.

Original No. 1,617,030, dated February 8, 1927, Serial No. 111,692, filed May 26, 1926. Application for reissue filed June 17, 1927. Serial No. 199,614.

This invention relates to improvements in washing machines and is directed particularly to the provision of novel agitating means therefor.

The present invention is specifically directed to the structure and composition of an agitator and for purposes of illustration is herein shown in connection with an agitating means that operates at the bottom of the container for the purpose of inducing lateral deflection and upward projection of the fluid content.

The invention also includes service utility because of the nature of the agitator structure as a whole being developed from a material lighter than metal, as for instance, a condensation product which is a substituted or synthetic resin, whereby the shock attending reversing action of the agitator may be minimized to the smallest possible degree.

Referring to the drawings—

Fig. 1 is a perspective view of an agitator, partly in broken section, and presenting diagrammatic showing of a container and a driving member for the agitator.

Referring more particularly to the drawings, 11 refers to a shaft adapted to be oscillated alternately in opposite directions. 12 is the disk portion of the agitator, adapted, in practice, to be seated approximately at the bottom of the container, and 13 is a sleeve member integrally connected with said disk and extending upwardly therefrom for a substantial distance sufficient to be carried above the designed normal water line within the container. 14 is an angularly fashioned portion at the interior upper end of the sleeve member, adapted for seating upon and in clutching relation with a similar angularly fashioned portion 15 of drive shaft 11. 16 refers to relatively offset portions of a column 16[a] to provide a bearing surface between said column and sleeve portion 13 for service in centering said members respectively to prevent lateral shift of the lower portion of the agitator from impingement with the container content during operation.

Special reference is made to the agitator blades generally referred to as 17, the same being preferably formed integral with the body of the agitator and disposed at spaced intervals about the upper face of the disk, said blades being formed from comparatively thin wall members 18, spaced apart, as shown, and united at their upper and outward face portions by a wall or bridge portion 19 thereby forming a narrow channelway between the blade sections that serves for strengthening as well as reducing the weight of the agitator as a unit, and in addition serves to present a wide abrasive surface that will not tear or damage the clothes in the container when the agitator is reciprocated.

In practice, reverse action attending the operation of agitators, when such agitators are formed from metal or absorbent material, as wood, has resulted in excessive jar and attendant strain, in case of metal, because of its natural specific gravity, and in case of wood, because when soaked with water, it becomes very heavy. This jar and attendant strain has caused wearing action upon the machine parts and unnecessary power requirement.

The present invention contemplates the formation of the agitator from a condensation product belonging to that group of chemical compounds known as synthetic or substituted resins. The use of such a material in the agitator affords many important advantages which have not been obtainable heretofore in the washing machine art through the use of wood or metal.

The agitator is impervious to water, is much lighter than metal, and is far more serviceable. It does not corrode, and even after a long period of service, the active surfaces remain smooth and unbroken. After use, a metallic dolly becomes corroded and covered with a small scale which results from the action of the soaps and alkalies used in the washing operation. Such a roughened dolly has a disastrous effect upon clothes, especially if they are of fragile and soft material. A dolly formed from the material indicated by the present invention retains its original smoothness throughout its life, and in addition does not warp or bend. Owing to its light weight, the operation of the machine is rendered less expensive due to the fact that less power is consumed in reciprocating the dolly.

The applicant's dolly is more sanitary than the previously known metallic and wooden dollies, as it does not develop permanent accumulations of deleterious matters such as dirt, grease and the like. It has proven to be more efficient due to the resulting increases of water agitation. This is probably due to the fact that a dolly formed of a product that is the result of chemical reactions or substitutions has less skin friction than the usual metallic dollies.

A further advantage of the applicant's dolly is that much of the noise incident to the operation of former washing machines of this type is eliminated by its use.

Still another very important advantage is that the applicant's dolly is a non-absorber and non-conductor of heat. This has the advantage that the bearings on which the dolly is mounted are shielded from the heat of the washing fluid or water, and that the dolly itself may be readily removed immediately after the termination of the washing operation if desired.

The above description, it is thought, fully presents the material features of advantage of the agitator herein, and presents a preferable form of embodiment. However, other characterstics of service and advantage are obviously included within the agitator structure, and with respect to the form presented, it is similarly obvious that other forms may be employed that may serve measurably to perform the full functions of that of the disclosure, and hence all structures and forms of structures possessing the utilities herein presented are claimed as being within the concept of invention herein set forth.

What I claim is:

1. An agitator adapted for use within a washing machine tub formed from a phenolic condensation product.

2. An agitator adapted for use within a washing machine tub comprising a member having a plurality of baffles thereon, said member and baffles being formed from a phenolic condensation product.

3. A dolly for washing machines comprising a disk, a hollow sleeve member projecting upwardly from the center portion of said disk, a plurality of spaced baffle members provided upon the upper portion of said disk and adjacent the lower end of the sleeve member, the said disk, sleeve member, and baffles being integrally formed from a phenolic condensation product.

4. An agitator adapted for use within a washing machine tub formed from an organic condensation product having the essential physical properties of a synthetic resin, which properties adapt it for the purpose specified.

5. An agitator adapted for use within a washing machine tub formed from an organic condensation product which is a synthetic resin, the said agitator having substantially the same physical properties as an agitator formed from a phenolic condensation product.

In testimony whereof, I have hereunto affixed my signature.

JOHN ROCKE.